United States Patent

Wong

Patent Number: 6,063,430
Date of Patent: May 16, 2000

[54] BLENDED NUT SPREAD COMPOSITIONS AND METHOD OF MAKING

[75] Inventor: Vincent York-Leung Wong, Hamilton, Ohio

[73] Assignee: The Procter & Gamble Company, Cincinnati, Ohio

[21] Appl. No.: 09/323,634

[22] Filed: Jun. 1, 1999

Related U.S. Application Data

[60] Provisional application No. 60/089,368, Jun. 15, 1998.

[51] Int. Cl.⁷ .................................................. A23L 1/38
[52] U.S. Cl. ........................ 426/633; 426/518; 426/519; 426/632
[58] Field of Search .................................. 426/633, 518, 426/519, 632

[56] References Cited

U.S. PATENT DOCUMENTS

| | | | |
|---|---|---|---|
| 5,034,242 | 7/1991 | Lasdon et al. | 426/633 |
| 5,079,027 | 1/1992 | Wong et al. | 426/633 |
| 5,508,057 | 4/1996 | Wong et al. | 426/633 |
| 5,518,755 | 5/1996 | Wong et al. | 426/633 |
| 5,667,838 | 9/1997 | Wong et al. | 426/633 |
| 5,693,357 | 12/1997 | Wong et al. | 426/633 |
| 5,714,193 | 2/1998 | Fix et al. | 426/633 |

*Primary Examiner*—Helen Pratt
*Attorney, Agent, or Firm*—Melody A. Jones

[57] ABSTRACT

Nut spreads, especially peanut butter compositions, comprising a blend of mono-modal and multi-modal compositions. The blended peanut butters have a relatively low viscosity, yet avoid an oily appearance and greasy mouth feel. A product composition and method for making the product composition are disclosed.

19 Claims, 2 Drawing Sheets

BLENDED NUT SPREAD COMPOSITIONS AND METHOD OF MAKING

CROSS REFERENCE TO RELATED APPLICATIONS

This application claims the benefit of U.S. Provisional Application No. 60/089,368, filed Jun. 15, 1998.

TECHNICAL FIELD

This application relates to nut spreads, especially peanut butters having reduced stickiness. This application particularly relates to peanut butters having reduced stickiness and viscosity without loss of desired nut flavors, and without having an oily appearance or greasy mouthfeel.

BACKGROUND OF THE INVENTION

Conventional peanut butter and other nut butters typically comprise cohesive, comminuted mixtures of solid nut particles suspended in oil (nut paste), a sweetener such as sugar, high fructose corn syrup or honey, salt and a stabilizing agent (e.g., a high melting point fat or hardstock) to prevent separation of the oil and particulates. The primary component of peanut butter, peanut paste, is formed by roasting, blanching, and grinding shelled peanuts. During the grinding step, the cellular structure of the peanuts is ruptured, releasing the peanut oil in which the pulverized peanut solids become suspended.

There are a number of factors that consumers consider in evaluating the desirability of peanut butter. One is its "stickiness" perception. The consumer perceives "stickiness" as the adhesion to the roof of the mouth of the mass of ingested peanut butter, as well as the effort it takes for the tongue to remove it therefrom. However, what the consumer senses as "stickiness" is not due primarily to adhesive forces, but instead to the cohesiveness of the mass of peanut butter as it is worked on jointly by chemical (saliva) and physical (tongue) forces in the mouth. Indeed, "stickiness" decreases as the saliva and tongue reduce the viscosity of this mass of peanut butter to the point that it can be easily swallowed.

Another factor considered by consumers is "peanut flavor" perception. The mechanism by which peanut flavor is released is believed to be due to the hydration of the nut solids in the mouth by saliva. While the total amount of peanut flavor present in the nut solids is important, it appears that the ability to effectively hydrate these nut solids primarily affects peanut flavor intensity. Indeed, the more uniform the hydration of these nut solids, the more intense will be the perceived peanut flavor.

Another factor considered by consumers is the visual appearance and mouth feel of the peanut butter in terms of the apparent oiliness and/or the level of "greasiness" of the peanut butter. Typically, such oiliness and/or "greasiness" is undesirable. Further, it is typical that as the viscosity and fineness of grind of a peanut butter is reduced to improve texture and spreadability, the visual appearance and mouthfeel of the butter become undesirably oily and greasy. The product displays an oily sheen due to the way the very fine particles reflect light. Additionally, the absence of particles of an appreciable size results in the product having a greasy mouthfeel.

Prior efforts to reduce the stickiness perception of peanut butter without adversely affecting peanut flavor intensity have generally been unsuccessful. In the past, there has usually been a trade off between stickiness reduction and peanut flavor intensity, i.e., increases in peanut flavor also increase stickiness and vise versa. For example, chunky type peanut butters made with larger peanut granules have more peanut flavor compared to creamy style peanut butters. However, the processing conditions that create these larger particle size peanut solids generally lead to stickier peanut butters because of increases in viscosity. Conversely, fine grinding of the nut solids (i.e., reducing the particle size) disperses flavor components throughout the nut paste, thus decreasing the flavor impact of these nut solids.

To reduce stickiness, the viscosity of the peanut butter needs to be reduced. The viscosity of the peanut butter is affected primarily by the particle size distribution (PSD) of the nut solids. Peanut butters made by milling the nut solids to a mono-modal particle size distribution have relatively lower viscosities. See U.S. Pat. No. 5,079,207 (Wong et al.), issued Jan. 7, 1992 (roll milling nut solids to a mono-modal particle size distribution). Conversely, a coarser grind results in a more viscous peanut butter because the nut solids exist in a multi-modal (or poly-modal) particle size distribution, resulting in an increase in particle packing behavior and a greater tendency under stress of the nut particles to collide with each other. Another reason for the higher viscosity of poly-modal PSD peanut butters is that coarse grinding of the nuts ruptures fewer oil cells, resulting in less free oil in the nut solid suspension.

A reduction in viscosity can be further achieved by increasing the amount of shear imparted to the nut paste to uniformly disperse particles with the oil (called work of distribution), and/or by increasing the level of added oil. A high shear mixer such as a Greerco colloid mill can be used to provide shear energy to disperse particles with the oil. U.S. Pat. No. 5,714,193 issued Feb. 3, 1998 to Fix et al. discloses addition of oil, and is incorporated herein by reference.

Unfortunately, prior attempts to reduce the viscosity of the peanut butter have also led to a significant reduction in peanut flavor intensity. This has been attributed to a reduction in the residence time in the mouth of the mass of ingested peanut butter. This shorter in-mouth residence time decreases the peanut flavor intensity because the solids are hydrated to a lesser extent. In addition, high pressure or multiple pass homogenization often grinds the nut solids to such a fine size that a significant portion of the peanut flavor volatiles originally present are lost.

U.S. Pat. No. 5,693,357 to Wong et al. discloses a nut paste having a particular mono-modal particle size distribution, and U.S. Pat. No. 5,508,057 (Wong et al.) discloses a process of making mono-modal nut butters, which patents are incorporated herein by reference.

Another factor affecting consumer acceptability of peanut butter is its grittiness impression. Grittiness occurs when the solid particles in the peanut butter are of a sufficient size and appropriate geometry that the tongue can sense them. Solids that can impart grittiness include not only the peanut solids, but also other non-fat solids that are typically present in the peanut butter, especially water soluble solids such as sugar and salt. One way to reduce this grittiness impression is by simply passing the mixture of peanut paste and other non-fat solids through a high pressure homogenizer to reduce all the solids to a finer size. See U.S. Pat. No. 5,518,755 (Wong et al), issued May 21, 1996, which patent is incorporated herein by reference.

Accordingly, it would be desirable to formulate a peanut butter that: (1) has a reduced stickiness impression; (2) has desired peanut flavor intensity; (3) has a reduced grittiness impression; (4) has a desirable appearance (does not have an oily appearance); and (5) has a desirable mouthfeel (does not have a greasy mouthfeel).

SUMMARY OF THE INVENTION

The present invention relates to nut spreads, especially peanut butters, having reduced stickiness and viscosity, while maintaining desired nut flavor intensity, and while avoiding an oily appearance and a greasy mouthfeel. The present invention also relates to a method for making such a nut spread, especially peanut butter.

Applicant has found that by blending a nut spread or butter having a mono-modal particle size distribution with a nut spread or butter having a multi-modal particle size distribution, the resulting blended nut spread or nut butter composition can have a creamy texture and good peanut flavor, and yet avoid an oily appearance and greasy mouthfeel.

The present invention provides a nut paste, nut butter, or nut spread composition having a total solid particle content, including but not limited to water insoluble solids, wherein the composition has a total solids particle size distribution such that between about 22% and about 34% of the total solids have a particle size between 16.7 microns and 87.1 microns, and preferably between about 25% and about 33% of the total solids have a particle size between 16.7 microns and 87.1 microns. The water insoluble solid particles, including but not limited to the nut solids particles, can have a particle size distribution with the same characteristics.

In contrast, mono-modal peanut butters typically have less than 21% of total solids with a particle size between 16.7 microns and 87.1 microns, and bi-modal peanut butters typically have more than 35% of total solids with a particle size between 16.7 microns and 87.1 microns.

The compositions of the present invention avoid an oily appearance and greasy mouthfeel, yet can have an apparent viscosity less than about 1500 centiPoise (cP), more preferably less than about 1200 cP, and in a particular embodiment less than about 1000 cP. Apparent viscosity is measured at a shear rate of 6.8 $\sec^{-1}$ as set forth below in "Test Methods".

The compositions of the present invention can comprise from about 42% to about 60% by weight fat, more particularly from about 45% to about 55% by weight fat, and even more particularly from about 48% to about 52% by weight fat.

The present invention provides a method of preparing a nut butter or nut spread composition, the method comprising the steps of:

providing a first nut butter or nut spread comprising solids having a mono-modal particle size distribution;

providing a second nut butter or nut spread composition having a multi-modal particle size distribution, such as a bi-modal particle size distribution; and blending the first and second compositions to provide a third nut butter or nut spread composition.

In particular, the step of providing the first composition can comprise providing a nut butter or nut spread composition having a mono-modal particle size distribution wherein about 25% or less of the total solid particles have a particle size between 16.7 microns and 87.1 microns, and wherein the step of providing the second composition comprises providing a nut butter or nut spread composition having a multi-modal particle size distribution wherein about 25% or more of the total solid particles have a particle size between 16.7 microns and 87.1 microns.

The step of blending the first composition and the second composition can comprise forming a blend of about 15% to about 95% by weight of the first composition, more particularly about 40% to about 80% by weight of the first composition, and even more particularly about 55% to about 75% by weight of the first composition.

The method can further comprise the step of shearing the blend of the first and second compositions to provide the third composition, and in particular, the step of shearing the blend can comprise shearing the blend to provide the third composition with a viscosity of less than about 1500 cP, more particularly less than about 1200 cP.

DETAILED DESCRIPTION OF THE INVENTION

The blended nut compositions of the present invention include peanut spreads, including peanut butters, made by blending mono-modal nut compositions with multi-modal nut compositions. The blended nut compositions have a total solids particle content, including but not limited to water insoluble solids such as nut solids, wherein the total solids particle size distribution is such that between about 22% and about 34% of the total solids have a particle size between 16.7 microns and 87.1 microns. In particular, between about 25% and about 33% of the total solids can have a particle size between 16.7 microns and 87.1 microns. The blended nut compositions can include from about 42% to about 60% by weight fat. The blended nut compositions preferably have an apparent viscosity of less than about 1500 cP, more preferably less than about 1200 cP, and in one embodiment less than about 1000 cP.

A. Definitions

As used herein, "nut paste" means a suspension of nut solids and oil resulting from the milling of nuts, which milling ruptures the nut oil cells.

As used herein, the term "nut spread" means a spreadable food product made primarily from nut solids and fat/oil, plus other ingredients such as nut butter stabilizers, flavorants, flavor enhancers, bulking agents, emulsifiers, etc. Nut spreads include, but are not limited to, "nut butters and "peanut butters" as these terms are defined by the standards of identity of the Food and Drug Administration.

As used herein, the term "total fat" refers to the total amount of fat and oil present in the nut spread. While the terms "fat" and "oil" are used somewhat interchangeably, the term "fat" usually refers to triglycerides (and their corresponding substitutes) that are solid or plastic at ambient temperature, while the term "oil" usually refers to triglycerides (and their corresponding substitutes) that are liquid or fluid at ambient temperature.

Figure 1:
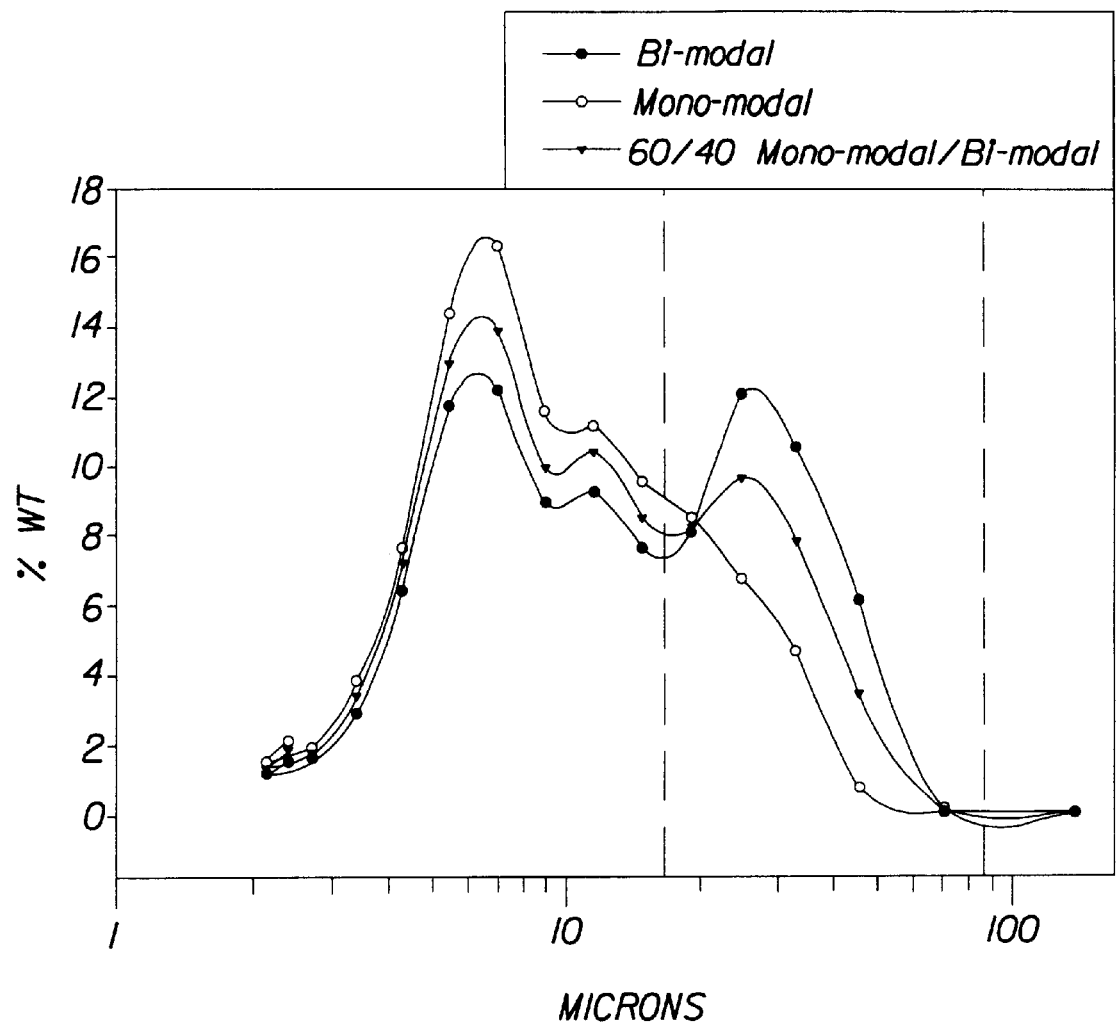
FIG. 1 is a graphical representation showing the particle size distribution curves of a mono-modal composition (curve points represented by open circles), a bi-modal composition (curve points represented by closed circles), and the composition of the present invention (curve points represented by triangles); wherein the Y-axis has units of weight percent, and wherein the X-axis (log scale) has units of microns.

As used herein "mono-modal" refers to a particle size distribution of solids having essentially a single peak, wherein the peak is centered at a particle size less than 14 microns. A mono-modal particle size distribution is illustrated in FIG. 1 by the plotted line having points in the form of open circles. A "peak" is a local maxima which is at least 2 weight percent units greater than the local minima on either side of local maxima.

As used herein, "multi-modal" or "poly-modal" refers to a particle size distribution curve having multiple peaks, including at least one peak centered at a particle size less than 14 microns and at least one peak centered at a particle size greater than 14 microns. A bi-modal distribution is illustrated in FIG. 1 by the plotted line having points in the form of closed circles.

B. Nut Solids, Nut Paste and Fats/Oils

A primary ingredient of the nut spreads according to the present invention are the nut solids that are derived from nuts and oil seeds. While the present invention will be often be described in terms of nut solids derived from peanuts, it should be understood that other sources of nut solids such as almonds, pecans, walnuts, cashews, filberts, macadamia nuts, Brazilians, hazel nuts, sunflower seeds, sesame seeds, pumpkin seeds and soybeans can be used as well. Mixtures of these nut solids can also be used.

The flavor of the nut paste can be that of the natural (raw) nut or is more typically developed by subjecting the nuts to a thermal operation, usually roasting. For example, peanuts can be roasted in a hot air convection roaster (e.g., a Jet Zone roaster manufactured by Wolverine). The flavor character and intensity are controlled by the roast temperature and the roast time.

Generally, roasting peanuts at a higher roast temperature and shorter time has resulted in the most desirable peanut flavor. However, there is a limit to the amount of peanut flavor that can be developed by this approach. Roasting peanuts at higher temperatures cause a non-uniform temperature profile and in turn a non-uniform flavor profile within the peanut. It is this non-uniformity in flavor (darker roast outside and lighter roast inside) that creates a more desirable peanut flavor relative to peanuts roasted to the same color but at a lower roast temperature. However, because of the non-uniform roasting profile within the peanut, roasting to a darker roast color to further intensify peanut flavor can cause over-roasting of the outer peanut to occur, leading to burnt notes.

A way to intensify peanut flavor while minimizing burnt notes caused by over-roasting is to combine peanuts roasted separately to various roast colors. A combination of light and dark roasted peanuts can result in a more intense and preferred peanut flavor character. The combination of a light and dark roast fraction simulates the flavor profile developed within a peanut that is roasted at high roast temperatures. This flavor profile can be manipulated by varying the proportion of peanuts roasted to different roast colors. Moreover, peanut flavor perception can also be manipulated by controlling the grind size of the various roasted peanut fractions. For example, peanuts roasted to a darker roast color can be milled to a very fine particle size without losing its flavor because of the low volatility of the flavors generated during roasting. Conversely, peanuts roasted to a lighter color should be milled to a larger particle size because of the high volatility of the flavors generated during roasting.

The nut spreads according to the prevent invention can comprise from about 25 to about 60% nut solids, preferably from about 35 to about 55% nut solids, most preferably from about 40 to about 50% nut solids. These nut solids are typically dispersed or suspended in oil derived from the respective nut in the form of a "nut paste." The nut paste can be made by comminuting nuts using any conventional grinder such as Bauer mill, Urschel or Fitzmill that provides an oil continuous suspension and reduces the viscosity of the paste. These nut pastes typically have a bi-modal particle size distribution, with two peaks formed by the overlap of two particle distribution curves.

The nut spreads of the present invention can contain added oil. As used herein, "added oil" means that the nut spreads contain additional oil over and that is normally expressed from the nut during paste formation. The purpose of this added oil is to reduce the viscosity of the nut spread, especially after the nut spread has been processed as described hereafter. The nut spreads of the present invention contain at least about 4% (preferably at least about 5%) added oil. Typically, the amount of added oil is in the range of from about 4 to about 12%, preferably from about 5 to about 7%.

The added oil used in the nut spreads is typically that which is naturally expressed from the nut or seed, such as during the formation of a nut paste. However, oils such as soybean oil, palm oil, cottonseed oil, coconut oil, walnut oil and other suitable edible oils can also be used, in whole or in part, as the added oil in making the nut spreads of the present invention. Preferably, added oil is peanut oil expressed during formation of the peanut paste. For nut spreads made from other nuts and oil seeds, such as the sunflower seeds, mixtures of oils can be preferred for flavor.

Low calorie and zero calorie oil substitutes, such as sucrose polyesters of long chain fatty acid (olestra) and other polyol polyesters of fatty acids, can be used as the added oil in making these nut spreads. See, for example, U.S. Pat. No. 3,600,186 (Mattson et al.) issued Aug. 17, 1971; U.S. Pat. No. 5,422,131 (Elsen et al), issued Jun. 6, 1995; U.S. Pat. No. 5,419,925 (Seiden et al), issued May 30, 1995; U.S. Pat. No. 5,071,669 (Seiden), issued Dec. 10, 1991, all of which are incorporated by reference. Mixed triglycerides made from medium and long chain saturated and/or unsaturated fatty acids can also be used as the added oil herein. See, for example, U.S. Pat. No. 5,288,512 (Seiden), issued Feb. 22, 1994, which is incorporated by reference. Oils that contain medium chain triglycerides can also be used be used as the added oil source. See U.S. Pat. No. 4,863,753 (Hunter et al), issued Sep. 5, 1989, which is incorporated by reference.

In addition, mixtures of oils or oil substitutes may be used in the nut spreads of the present invention.

The total fat present (i.e., that obtained during comminution of the nuts plus added oil) in the nut spreads of the present invention can vary widely depending upon the viscosity desired, the fat level desired and like factors. If desired, the total fat present can be such as to satisfy the standard of identify for nut spreads, such as peanut butter. Nut spreads of the present invention typically comprise from about 42 to about 60% total fat. Nut spreads of the present invention preferably comprise from about 45 to about 55%, most preferably from about 48 to about 52%, total fat.

C. Water-Soluble Solids

The nut spreads of the present invention can also comprise from about 3.5 to about 25%, more particularly from about 5 to about 10%, water-soluble solid components. These water water-soluble solids can be selected from flavorants, flavor enhancers, bulking agents, as well as mixtures thereof.

As used herein, the term "flavorant" refers to agents that contribute to the flavor of the nut spread. These include sweeteners, natural and artificial flavors, and other flavorants that contribute to the flavor of the nut spread, including natural or artificial peanut flavors, roasted flavors, praline/caramel flavors, walnut flavors, almond flavors and flavor compositions. Sweeteners can be selected from sugars, sugar mixtures, artificial sweeteners and other naturally sweet materials. Sugars include, for example, sucrose, fructose, dextrose, honey, high fructose corn syrup, lactose, maltose, and maltose syrups. Preferably, the sweetener will have a sweetness intensity the same or similar to that of sucrose or fructose. Sugars are typically included in the nut spreads of the present invention at a level of from about 0.5 to about 10%, preferably from about 1 to about 7%.

Artificial sweeteners such as aspartame, acesulfam, saccharine, cyclamate and glycerrhizin can also be used in the nut spreads of the present invention. The amount of artificial sweetener used depends on its sweetness intensity. Typically, these artificial sweeteners are included in amount that provides a sweetness intensity equivalent to the addition of from about 0.5 to about 10%, preferably from about 1% to about 7%, sucrose.

Usually from about 0.001% to about 2% artificial sweetener is used.

As used herein, "flavor enhancers" refer to agents that enhance or complement the flavor of the nut spread. Flavor enhancers include salt or salt substitutes such as sodium chloride, potassium chloride, sodium chloride/potassium chloride mixtures, and seasoned salts. The level of flavor enhancer used is a matter of the desired taste level, but usually is from about 0.1 to about 2%, preferably from about 0.5 to about 1.5%, of the nut spread. The nut spreads of the present invention can also comprise from about 0.01% to about 0.02% citric acid as a flavor enhancer. Preferably from about 0.01% to 0.015% citric acid is used. The addition of citric acid can enhance the roasted nut and especially the roasted peanut butter flavor and saltiness impression, thereby reducing the amount of salt required to give the nuts spreads, especially peanut butters, of the present invention an acceptable flavor. The addition of citric acid, especially in the presence of a metallic ion salt, also allows the nut spread to achieve oxidative stability through chelation of the metal ions by the citric acid.

Particularly preferred flavor systems for use in the nut spreads of the present invention are those involving a combination of sugar and salt. For nut spreads using this preferred flavor system, the sugar is typically present in the spread at a level from about 0.5 to about 10%, preferably from about 1 to about 7%; the level of salt is typically present in the spread at a level of from about 0.1 to about 2%, preferably from about 0.8 to about 1.5%.

Water soluble bulking agents can also be used in the nut spreads of the present invention. These bulking agents typically add body or texture to the spread and can be non-nutritive or low calorie materials. Suitable bulking agents include corn syrup solids, maltodextrin, dextrose, polydextrose, mono- and disaccharides, starches (e.g., corn, potato, tapioca wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541 (Mazur), issued Aug. 20, 1991.

In order to minimize grittiness, these water-soluble solids preferably have a relatively fine particle size. Water soluble solids included in the nut spreads of the present invention typically have a mean particle size of about 20 microns or less. Especially preferred water soluble solids have a mean particle size of about 10 microns or less.

D. Other Solids

Nut spreads of the present invention can comprise solids other than nut solids and water soluble solids. These other solids can be present in the nut spreads of the present invention in combined amounts of up to about 20%, preferably up to about 10%. These other solids can include fibers, such as cellulose, flours (e.g., wheat, rye, pea) and protein supplements such as additional peanut solids, soy flour, soy concentrate, soy isolate, casein, egg whites, and protein from other animal or vegetable sources; or any combination thereof.

E. Nut Butter Stabilizers and Emulsifiers

The nut spreads of the present invention can also optionally but preferably comprise a nut butter stabilizer in effective amounts up to about 5%. Preferably from about 1 to about 3% nut butter stabilizer is used. These nut butter stabilizers can be any of the known peanut butter stabilizers, for example, hydrogenated rapeseed oil, or other hydrogenated triglycerides having a high proportion of $C_{20}$ and $C_{22}$ fatty acids. See for example, U.S. Pat. No. 3,265,507 (Japikse), issued Aug. 9, 1966 and U.S. Pat. No. 3,129,102 (Sanders), issued Apr. 14, 1964, which are incorporated herein by reference.

These stabilizers are usually triglycerides which are solid at room temperature. They solidify in the nut spread in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil, and similar materials. This stabilizer can also be mixed with lower melting fat fractions as, for example, the peanut butter stabilizer composition disclosed in U.S. Pat. No. 4,341,814 (McCoy), issued Jul. 27, 1982, which is incorporated herein by reference.

Other suitable nut butter stabilizers for nut spreads of the present invention include tailored $\beta'$ stable hardstocks referred to as "PSP/PSS" hardstocks, as disclosed in U.S. Pat. No. 4,996,074 (Seiden et al), issued Feb. 26, 1991, which is incorporated herein by reference. Highly hydrogenated high erucic acid rapeseed oil shown in Example VI of this patent is an example of a $\beta'$ tending hardstock particularly suitable for use in combination with the PSP/PSS hardstock. When the PSP/PSS hardstock is used in combination with highly hydrogenated (Iodine Value less than 20, preferably less than 10) high erucic acid (preferably at least about 40%) rapeseed oil, it should be used in ratios of PSP/PSS hardstock:high erucic acid rapeseed oil of from about 30:1 to about 10:1, preferably from about 27:1 to about 20:1. The high erucic acid rapeseed oil is more fully discussed in this patent at column 7, line 50 to column 8, line 14.

Emulsifier can also be used in the nut spreads of the present invention to achieve the proper texture. The emulsifier can be any food compatible emulsifier such as mono- and di-glycerides, lecithin, sucrose monoesters, polyglycerol esters, sorbitan esters, polyethoxylated glycols and mixtures thereof. Up to about 5%, and preferably from about 0.1 to about 3%, emulsifier is used.

F. Other Optional Components

Nut chunks (including defatted nut chunks), flavored or candied bits and other optional components can be included in the nut spreads of the present invention at various levels. These other components include chocolate chips or other flavored bits (e.g., butterscotch and peanuts), jellies (either low calorie jellies or regular jelly or preserves), and praline nuts or other candies. These other components are usually included at levels up to about 20% of the nut spread.

G. Preparation of Nut Spread

A nut spread having a bi-modal particle size distribution useful in making the compositions of the present invention can be prepared by starting with a mixture of the nut paste and the added oil that is usually deposited into a mixing tank. The nut paste comprises from about 50 to about 90%, preferably from about 55 to about 85%, most preferably from about 60 to about 84% of the mixture. The other nut spread ingredients (e.g., water soluble solids such as sugar and salt, bulking agents such as corn syrup solids, protein solids, stabilizer, and emulsifier) are also preferably mixed, added, blended, or otherwise combined together with this mixture of nut paste and added oil. It is desirable to add the water-soluble solids first, followed by the protein solids (i.e., soy protein), particularly when making a crunchy peanut spread. This keeps the protein from hydrating and/or denaturing and causing a higher viscosity spread.

After the nut paste and added oil, plus any of the other nut spread ingredients, have been mixed, added, blended or otherwise combined together, the mixture is then typically passed through a high pressure homogenizer to reduce the grittiness of the mixture. See U.S. Pat. No. 4,352,573 (Pandolfe), issued Oct. 5, 1982 and U.S. Pat. No. 4,383,769 (Pandolfe), issued May 17, 1983 (both herein incorporated by reference) for suitable high pressure homogenizers made by APV Gaulin. Typically, this homogenization step is carried out a pressure of from about 3000 to about 5000 psig. This results in a peanut butter/spread that has a bi-modal particle size distribution, such as the bi-modal particle size distribution shown in FIG. 1.

A nut spread having a mono-modal particle size distribution useful in making the compositions of the present invention can be prepared using the mixture described above, but with the difference that the mixture is homogenized at a higher pressure than is the bi-modal mixture. Preferably, the mixture is homogenized at a pressure of 10,000 psig or more to provide a mono-modal particle size distribution. A high pressure homogenizer that can be used for this application is made by Rannnie which can operate at pressures up to 14,500 psig. It should be recognized that other high shearing devices can also be used to achieve a mono-modal particle size distribution. For example, the Asima mill manufactured by Bauermeister is capable of achieving this particular particle size distribution. U.S. Pat. No. 5,508,057 (Wong et al.), issued Apr. 16, 1996 (herein incorporated by reference) discloses a process for obtaining a mono-modal particle size distribution by high pressure homogenization. Spreads having a mono-modal particle size distribution typically have a creamier texture and lower stickiness, but with lower flavor intensity. Spreads having a bi-modal particle size distribution typically have higher nut flavor intensities.

A blend of the mono-modal and bi-modal peanut butters in ratios varying from 15–95% by weight, preferably 40 to 80% by weight, and most preferably 55–75% by weight, is then processed through a high shear mixer in order to reduce the apparent viscosity of the mix to 1500 cP or less, preferably less than 1200 cP. Suitable devices for high shear mixing include colloid mills (e.g., Greerco colloid mill, Fryma colloid mills) and high shear dispersers (Silverson, IKA). In particular a high shear mixing device manufactured by Copek Industries, called the Boston Shear Pump, is most suitable for this application. With this high shear mixer the mono-modal nut butter or spread can be blended with a non-homogenized poly-modal nut butter or spread.

After high shear mixing, the nut spread is then finished by passing it through a deaerator (versator) and a scraped wall heat exchanger to increase the oxidative stability of the nut spread and to set up its crystalline structure. The scraped wall heat exchanger is typically operated such that the freezer outlet temperature is between 90° F. (32° C.) and 100° F. (38° C.). Chunks or pieces of nuts can also be added to the finished spread at this point if desired.

Blended nut spreads prepared according to the present invention can have a near mono-modal particle size distribution, in that the blended nut spread has either no peak centered above 14 microns, or has a peak centered above 14 microns which is smaller than the corresponding peak of the bi-modal spread from which the blended spread is formed. A blended nut spread prepared according to the present invention can have a particle size distribution as shown by the particle size distribution curve in FIG. 1 having points in the form of triangles. Referring to FIG. 1, the nut spread of the present invention formed by blending a mono-modal spread and a bi-modal spread can have a peak centered below 14 microns, which peak is smaller than the corresponding mono-modal peak but larger than the corresponding bi-modal peak. Above 14 microns, the blended spread has a local maxima (which may or may not be a peak) which is above the corresponding portion of the mono-modal curve, but smaller than the corresponding bi-modal peak.

As a result of blending the multi-modal peanut butter which contains relatively larger size particles with the mono-modal nut butter, the resultant blended peanut butter has a sufficient number of larger size particles which help to eliminate oily sheen appearance and greasy mouth feel that would have resulted if only the mono-modal nut butter is used. Interestingly, the resultant mix maintains all of the textural advantages of the mono-modal nut butter including reduced stickiness, high spread ability, and high mouth melt.

Figure 2:
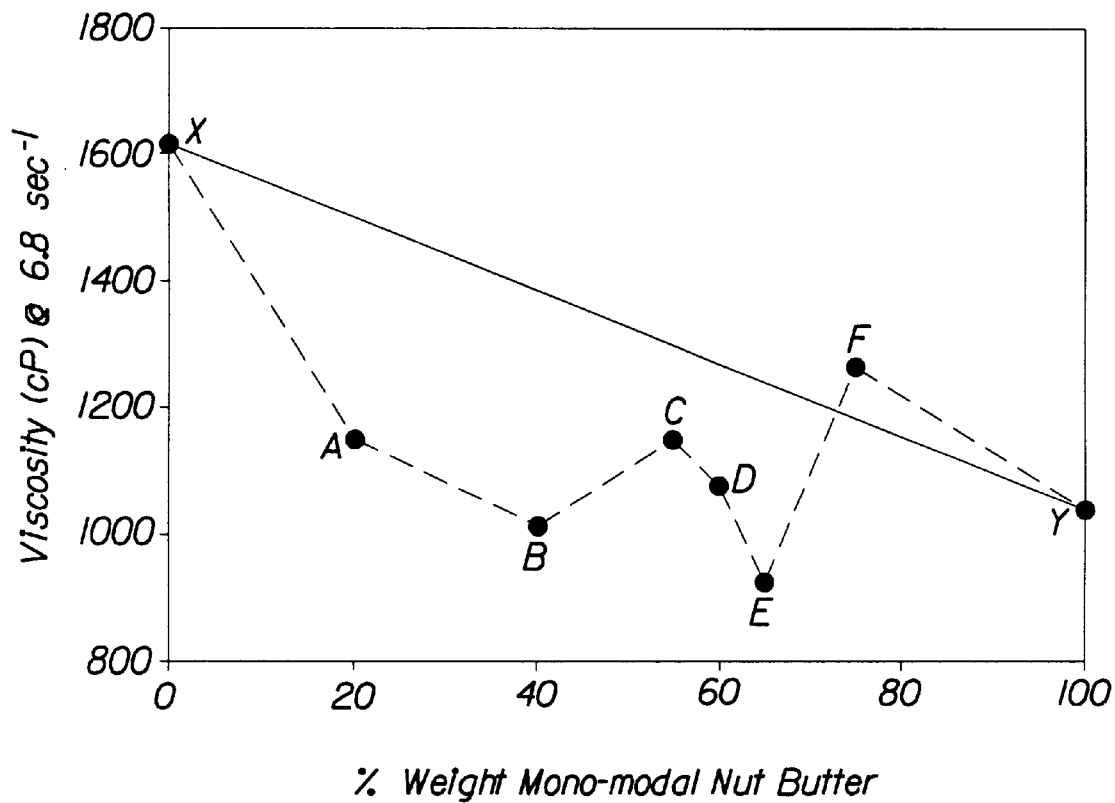
FIG. 2 is a graphical representation showing viscosity (centiPoise) of blended compositions on the Y-axis plotted as a function of percent by weight mono-modal nut butter on the X-axis, wherein the solid straight line in FIG. 2 represents calculated viscosity based upon a linear interpolation between 100% mono-modal peanut butter and 100% bi-modal peanut butter, and wherein the dotted line graph represents blends of mono-modal and bi-modal peanut butter according to the present invention.

Surprisingly, blending as little as 20% by weight of the mono-modal nut butter with a multi-modal nut butter can result in a significant decrease in the mix viscosity relative to the viscosity of the multi-modal nut spread. FIG. 2 illustrates the relatively low viscosity of blended nut spreads of the current invention, as compared to a bi-modal peanut spread. In FIG. 2, the solid straight line is a linear interpolation of viscosity from a 100% bi-modal spread to a 100% mono-modal nut spread. The 100% bi-modal nut spread is indicated by a point labeled X, and the 100% mono-modal nut spread is indicated by a point labeled Y. The dotted line in FIG. 2 includes solid points representing six discrete blended compositions of the present invention (points labeled A, B, C, D, E, and F) comprising bi-modal and mono-modal nut spreads, which blended compositions have a viscosity which is lower than the viscosity of the corresponding 100% bi-modal nut spread from which the blended compositions A-F are prepared.

The blended nut spreads of the present invention can further have an apparent viscosity of about 1500 cP or less, preferably about 1200 cP or less, most preferably about 1000 cP or less, and a Casson yield value of less than about 50 dynes/cm$^2$, preferably less than about 30 dynes/cm2, most preferably less than about 15 dynes/cm$^2$. The Casson plastic viscosity of the blended spreads can be less than about 5 poise, preferably less than about 3 poise. The apparent viscosity, Casson plastic viscosity, and Casson yield value are measured according to the procedure provided below in test methods.

TEST METHODS

1. Viscosity and Yield Value of Nut Pastes and Nut Spreads

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.). A sample of 14.0 grams of the nut spread or nut paste (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. (149° F.). After the temperature of the sample has reached 65° C. (149° F.) the sample is pre-sheared for five minutes at 50 rpm. The speed is then changed to 100 rpm and a measurement taken after waiting a period of time for the dial reading to settle to a constant value. A total of five scale readings are recorded: for 100, 50, 20, 10 and 5 rpm. In general, the waiting time befor reading the dial setting should be as set forth in Table I.

TABLE 1

| RPM | Time Before Reading (Seconds) |
|---|---|
| 100 | 3 |
| 50 | 6 |
| 20 | 15 |
| 10 | 30 |
| 5 | 60 |

The rpm and dial reading are converted into shear stress and shear rate values by multiplying the rpm and reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the viscosity of the nut spread/nut paste at an infinite shear rate. It accurately predicts the resistance to flow in pumping, moving or mixing situations. The Casson plastic viscosity is measured in poise.

The second value is the yield value which is equal to the value of the x-intercept (abscissa) squared. The yield value is a measure of amount of force or shear that is necessary to get the nut spread/nut paste to start moving. The yield value is measured in dynes/cm$^2$. The relationship between the plastic viscosity and the yield value determine how a nut spread/nut paste behave in additional processing.

The apparent viscosity is the viscosity measured at 6.8 sec$^{-1}$ (Brookfield dial reading at 20 rpm). The apparent viscosity in cP is:

250×(the Brookfield Viscometer dial reading at 20 rpm)

Without being limited by theory, it is believed that the viscosity measured at 6.8 sec$^{-1}$ has the best correlation with sensory attributes.

2. Particle Size Analysis

A Malvern 2600D particle size analyzer with an IBM PS/2 computer is used to analyze the particle size of the samples. A small amount (about 0.01 grams) of sample is placed in a 25 ml test tube and about 15 ml of acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5, and preferably from 0.2 to 0.3 (20% to 30% of the light energy is reduced).

The apparatus is fitted with a 100 mm lens to determine the particle size of the paste or spread. Particle sizes from 0.5 to 188 microns can be measured using a 100 mm lens. A magnetic stirrer is used to insure that the sample is being dispersed during the readings. Each sample is swept 250 times by the laser for each reading. Each sample is read a minimum of three times with a five (5) minute wait between each reading.

EXAMPLES

The following are representative examples of peanut butters and spreads prepared according to the present invention.

1. Example 1

Peanut butter is prepared from the following total ingredient formulation.

| Ingredients | Wt. % |
|---|---|
| Peanuts | 83.55 |
| Sugar | 6.3 |
| Added Peanut Oil | 6.45 |
| Salt | 0.9 |
| Molasses | 0.5 |
| Stabilizer* | 2.1 |
| Emulsifier (mono and diglycerides of palmitic and stearic acids | 0.2 |

*Hardened rapeseed oil blended with hydrogenated soybean oil.

Peanuts are roasted at 416° F., blanched and ground in a Bauer mill. The ground peanuts are then deposited in a 100 gallon Hamilton kettle where all of the remaining ingredients are also added and mixed with the ground paste.

To make the mono-modal nut butter, a portion of the mix is then passed through a Rannie type # 18.72H Homogenizer at 12,000 psig. The homogenized paste has a FOG (fineness of grind) of 0.7 as measured on a Hegeman Gauge. Laser particle size analysis of the homogenized butter by a Malvern 2600 D laser particle size analyzer shows that the particles have a mono-modal particle size distribution as shown in FIG. 1. The amount of particles in the 16.7–87.1 micron size band is 20.5%.

To make the bi-modal nut butter, the same mixture is used, but the pressure in the Rannie homogenizer is reduced to 3000 psig. The bi-modal nut butter has FOG measurement of 3.5–4.0. Laser particle size analysis of the homogenized butter by a Malvern 2600 D laser particle size analyzer shows that the particles have a bi-modal particle size distribution as shown in FIG. 1. The amount of particles in the 16.7–87.1 micron size band is 36.8%.

The mono-modal and bi-modal nut butters are then combined in a 60/40 ratio and sheared to a low viscosity by processing the mix at 3000 lbs/hr through a Boston Shear Pump Model Turbo 37-3 manufactured by Copek Industries. The resultant blend has an apparent viscosity that is 1000 cP or less. The mixture is then passed through a heat exchanger to cool the mix temperature to 150° F. The mixture is then passed through a dearator (Versator) and a scraped wall heat exchanger to increase the product's oxidative stability and to set up its fat crystalline structure respectively. The scraped wall heat exchanger is operated such that the freezer outlet temperature of the product is 90° F. (32° C.) plus or minus 2° F. (2.2° C.). Chunks or pieces of nuts can also be added to the finished butter at this point if desired.

The peanut butter has a fat content of about 52% and a finished product apparent viscosity of about 875 cP. Malvern laser particle size analysis of this product shows a near mono-modal particle size distribution where the amount of particles in the 16.7–87.1 micron size band is 29.8%. The particle size distribution is depicted in FIG. 1 by the curve having points in the shape of triangles. This particle size distribution corresponds to the blend of point D in FIG. 2. The resulting blend has a very smooth and creamy texture, reduced stickiness, good peanut flavor and does not have an oily appearance or greasy mouth feel.

2. Example 2

The product is formulated in the same as Example 1. In this product a dark and light roast nut butter is prepared. The dark roast nut butter is prepared by roasting peanuts at 416° F. (213° C.) to a roast color of about 33.4 L'. The nuts are milled in a Bauer milled and combined with the remaining ingredients in a 100 gallon Hamilton kettle. The dark roast nut butter is then homogenized to a mono-modal particle size distribution by processing it the Rannie # 18.72H homogenizer at 12,000 psig.

The light roast nut butter is prepared by roasting peanuts at 404° F. (207° C.) to a roast color of about 37.5 L'. The nuts are milled in a Bauer milled and combined with the remaining ingredients in a 100 gallon Hamilton kettle. The dark roast mono-modal nut butter is then combined with the non-homogenized light roasted peanut butter mix in a 60/40 ratio. The mix is then processed through a Boston Shear Pump Model Turbo 37-3 at 3000 lbs/hr and through the fmishing system as in Example 1. The finished product has a viscosity of 900 cP. Malvern laser particle size analysis of this product shows a near mono-modal particle size distribution where the amount of particles in the 16.7–87.1 micron size band is 25.4%. The product has a very smooth and creamy texture, reduced stickiness, good peanut flavor and does not have an oily appearance or greasy mouth feel.

What is claimed is:

1. A nut paste, nut butter, or nut spread composition having a total solid particle content, including water insoluble solids, and wherein the composition has a solids particle size distribution such that between about 22% and about 34% of the total solids have a particle size between 16.7 microns and 87.1 microns.

2. The composition of claim 1 wherein between about 25% and about 33% of the solids have a particle size between 16.7 microns and 87.1 microns.

3. The composition of claim 1 wherein the composition has an apparent viscosity less than about 1500 centiPoise.

4. The composition of claim 3 wherein the composition has an apparent viscosity less than about 1200 centiPoise.

5. The composition of claim 4 wherein the composition has an apparent viscosity less than about 1000 centiPoise.

6. The composition of claim 1 wherein the composition comprises from about 42% to about 60% by weight fat.

7. The composition of claim 6 wherein the composition comprises from about 45% to about 55% by weight fat.

8. The composition of claim 7 wherein the composition comprises from about 48% to about 52% by weight fat.

9. The composition of claim 1 wherein the particle size distribution of the water insoluble particles is such that between about 22% and about 34% of the water insoluble particles have a particle size between 16.7 microns and 87.1 microns.

10. The composition of claim 1 wherein the particle size distribution of the water insoluble particles is such that between about 25% and about 33% of the water insoluble particles have a particle size between 16.7 microns and 87.1 microns.

11. A method of preparing a nut butter or nut spread composition, the method comprising the steps of:

providing a first nut butter or nut spread comprising solids having a mono-modal particle size distribution;

providing a second nut butter or nut spread composition having a multi-modal particle size distribution; and blending the first and second compositions to provide a third nut butter or nut spread composition.

12. The method of claim 11 wherein the step of providing the first composition comprises providing a nut butter or nut spread composition having a mono-modal particle size distribution wherein about 25% or less of the total solid particles have a particle size between 16.7 microns and 87.1 microns.

13. The method of claim 12 wherein the step of providing the second composition comprises providing a nut butter or nut spread composition having a multi-modal particle size distribution wherein about 25% or more of the total solid particles have a particle size between 16.7 microns and 87.1 microns.

14. The method of claim 11 wherein the step of blending the first composition and the second composition comprises forming a blend of about 15% to about 95% by weight of the first composition.

15. The method of claim 14 wherein the step of blending the first composition and the second composition comprises forming a blend of about 40% to about 80% by weight of the first composition.

16. The method of claim 15 wherein the step of blending the first composition and the second composition comprises forming a blend of about 55% to about 75% by weight of the first composition.

17. The method of claim 11 further comprising the step of shearing the blend of the first and second compositions to provide the third composition.

18. The method of claim 17 wherein the step of shearing the blend comprises shearing the blend to provide the third composition with a viscosity of less than about 1500 centiPoise.

19. The method of claim 18 wherein the step of shearing the blend comprises shearing the blend to provide the third composition with a viscosity of less than about 1200 centiPoise.

* * * * *